(12) United States Patent
Schadwinkel et al.

(10) Patent No.: US 8,482,852 B2
(45) Date of Patent: Jul. 9, 2013

(54) OPERATING DEVICE FOR THE FOCUSING OPERATION OF A MICROSCOPE

(76) Inventors: Harald Schadwinkel, Hannover (DE); Hubert Wahl, Stadtroda (DE); Klaus Becker, Breitenworbis (DE); Klaus-Georg Knupfer, Essingen (DE); Frank Nolte, Bovenden (DE)

( * ) Notice: Subject to any disclaimer, the term of this patent is extended or adjusted under 35 U.S.C. 154(b) by 513 days.

(21) Appl. No.: 12/680,181

(22) PCT Filed: Sep. 16, 2008

(86) PCT No.: PCT/EP2008/007691
§ 371 (c)(1),
(2), (4) Date: Jun. 23, 2010

(87) PCT Pub. No.: WO2009/040012
PCT Pub. Date: Apr. 2, 2009

(65) Prior Publication Data
US 2011/0038041 A1 Feb. 17, 2011

(30) Foreign Application Priority Data
Sep. 25, 2007 (DE) .......................... 10 2007 045 669

(51) Int. Cl.
*G02B 21/00* (2006.01)
(52) U.S. Cl.
USPC .......................................... 359/383; 359/384
(58) Field of Classification Search
USPC ................................................... 359/383, 384
See application file for complete search history.

(56) References Cited

U.S. PATENT DOCUMENTS

| 4,624,537 | A | * | 11/1986 | Hanssen et al. | 359/393 |
| 4,695,137 | A | * | 9/1987 | Jorgens et al. | 359/383 |
| 4,912,388 | A | * | 3/1990 | Tanaka et al. | 318/640 |
| 4,930,882 | A | * | 6/1990 | Koch et al. | 359/392 |
| 5,557,456 | A | * | 9/1996 | Garner et al. | 359/393 |
| 5,684,627 | A | * | 11/1997 | Ganser et al. | 359/388 |
| 7,369,304 | B2 | * | 5/2008 | Maenle et al. | 359/368 |
| 2003/0179445 | A1 | * | 9/2003 | Maenle et al. | 359/368 |
| 2004/0090671 | A1 | | 5/2004 | Gilbert | |
| 2008/0013168 | A1 | * | 1/2008 | Maenle et al. | 359/383 |
| 2008/0018994 | A1 | * | 1/2008 | Maenle et al. | 359/379 |
| 2008/0291532 | A1 | * | 11/2008 | Xu et al. | 359/383 |

FOREIGN PATENT DOCUMENTS

| AT | 215178 | 5/1961 |
| DE | 87 15 891.4 | 3/1988 |
| EP | 1 416 308 A1 | 5/2004 |
| JP | 2001-42229 | 2/2001 |
| JP | 2002-90649 | 3/2002 |
| WO | WO 2004/055572 A1 | 7/2004 |

* cited by examiner

*Primary Examiner* — Frank Font
(74) *Attorney, Agent, or Firm* — Patterson Thuente Pedersen, P.A.

(57) ABSTRACT

The focusing operation of a microscope, control rotary knobs which receive the motion of fingers or hand of an operator to change the focus position relative to a sample under observation. Two of the control rotary knobs are on a common shaft and coaxial with one another and rotationally fixed with respect to one another, and are connected to a position encoder. A toggle switch which is connected to the control circuit and can be actuated by touching or moving one or both rotary control knobs. Whereby the drive circuit is configured such that it generates, as a function of the rotation of the two rotary knobs and as a function of the actuation or position of the toggle switch, a rough or fine adjustment of the focus position relative to the sample under observation.

17 Claims, 3 Drawing Sheets a)

b)

OPERATING DEVICE FOR THE FOCUSING OPERATION OF A MICROSCOPE

PRIORITY CLAIM

The present application is a National Phase entry of PCT Application No. PCT/EP2008/007691, filed Sep. 16, 2008, which claims priority from German Application Number 10207045669.9, filed Sep. 25, 2007, the disclosures of which are hereby incorporated by reference herein in their entirety.

BACKGROUND OF THE INVENTION

The invention relates to a control device for the focusing element of a microscope, equipped with control knobs which receive a movement of the fingers or the hand of an operator and via gear elements change the focal position relative to a sample to be observed.

During microscoping, the adjustment of the optimal focal position is frequently the first and most important interaction of the operator with the microscope. Thereby, a control element is usually manipulated with an appropriate finger or hand movement, which triggers an adjustment movement and transfers said adjustment movement to a focusing element, e.g., a microscope lens, a lens turret, the sample stage, a tube lens, or an intermediate tube.

It is known that mechanical gear elements are exclusively provided for the transfer of the adjustment movement from the control element to the respective focusing element.

Alternatively to this classic version, it is known that the manually triggered movement of the control element, particularly a control knob, is initially converted into electric signals and that said signals are fed to an electronic control circuit which is connected to a drive motor; only then the movement triggered by the drive motor is transferred to the focusing element via gear elements.

The subsequently described invention is to be categorized in this field of motor-driven focusing.

Motor-driven focusing is especially prevalent in microscopes which are used for sophisticated research applications with the main concern of moving different focal positions with great repeat accuracy within the sub-micrometer range. Furthermore, motor-driven focusing also provides advantages in the area of industrial and biomedical applications with regard to precise and repeated focal adjustments as well as the resulting option of coupling the focusing speed with the respective set magnification of the microscope.

In this context, control devices are known which exhibit two control elements in the form of control knobs, whereby one is intended for manual triggering of a coarse adjustment and the other one for the manual triggering of a fine adjustment during focusing.

Since the adjustment of the focal position requires a delicate and precise, albeit manual movement, the operator needs to be provided with effortless working conditions.

Therefore, development and design of respective control devices always require consideration of the individual needs of the operator as well as a functional and economical design.

SUMMARY OF THE INVENTION

Based on the aforementioned, the invention is based on the task of creating a control device of the type initially described, which is optimized with regard to ergonomic aspects as well as reliable function and economical producibility.

This task, according to an embodiment of the invention, is solved in that both control knobs, which are not turnable coaxially and against each other with regard to their rotation axis, are arranged on a mutual shaft and connected through said shaft with a rotary angle encoder; and a toggle switch is provided, which is connected to the control circuit and activated through touching or moving of one or both control knobs; whereby the control circuit is designed in such a way that, dependent on the rotation angle predefined by both control knobs, and dependent on the activation of the toggle switch, it generates a coarse or fine adjustment of the focal position relative to the sample to be observed.

An embodiment of the invention provides the toggle switch designed as a proximity switch and assigned to one of the control knobs;

so that at a shorter distance of a hand or the fingers of a hand to said control knob, a coarse adjustment of the focal position is generated by the control circuit, dependent on a rotation angle predefined by both control knobs; and at a greater distance of the hand or the fingers of a hand to said control knob, a fine adjustment of the focal position is generated by the control circuit, dependent on a rotation angle predefined by both control knobs.

Of course, embodiments of the invention also include the reverse design, whereby at a shorter distance from the respective control knob, a fine adjustment is generated by the control circuit, dependent on a rotation angle predefined by both control knobs, and/or at a greater distance from the respective control knob, a coarse adjustment is generated by the control circuit.

The proximity switch can be a capacitive or optical sensor or function in accordance with any other known principle.

The design of the toggle switch as a contact switch lies within the scope of the invention.

In a preferred variation of this first embodiment, the proximity switch, for example, is assigned to the control knob with the smaller diameter, and the control circuit is designed in such a way that the control circuit, dependent on a rotation angle predefined by both control knobs, generates a coarse adjustment of the focal position, when said control knob is covered with the hand or the fingers of the hand.

As a result, the targeted activation of the proximity switch or even a contact switch effects a switchover of both control knobs for joint use either for the purpose of a fine or a coarse adjustment.

A second embodiment of the invention provides that at least one of the two control knobs is axially movable between two end positions; and the toggle switch is designed as a limit switch and assigned to one of said end positions;

so that the control circuit, dependent on a rotation angle predefined by both control knobs, generates a coarse adjustment of the focal position through an axial shift of one or both control knobs and an activation of the limit switch triggered by said shift; and the control circuit, dependent on a rotation angle predefined by both control knobs, generates a fine adjustment of the focal position when the limit switch is not activated.

Of course, once again the invention also includes the reverse design, whereby an axial shift of one or both control knobs and subsequent activation of the limit switch, the control circuit generates a fine adjustment, and a coarse adjustment when the limit switch is not activated, whereby the adjustment travel is predefined, dependent on the rotation angle.

Different variations of the second embodiment of the invention allow that either both control knobs are axially movable and, therefore, activate the limit switch or only one of the two control knobs is axially movable and thereby activates the limit switch.

Through activation of the toggle switch, triggered in a simple manner, the first as well as the second embodiment of the invention effect a switching between a fine and coarse adjustment through turning of the control knobs.

In all previously described embodiments, both control knobs are preferably designed with different diameters, whereby the control knob with the smaller diameter is assigned to fine adjustment while the control knob with the greater diameter is assigned to coarse adjustment. Of course, a reverse design is included in the scope of the invention, whereby the control knob with the smaller diameter is assigned to coarse adjustment.

Furthermore, it is possible that at least one of the control devices, according to embodiments of the invention,

- is designed as a separate assembly, i.e., detached from the microscope or microscope stand, and therefore freely positionable next to the microscope, whereby said assembly includes both control knobs and the rotary angle encoder, while control circuit, drive motor, and gear elements are housed in the microscope stand;
- or arranged permanently or randomly varying on a predetermined place on the microscope, while control circuit, drive motor, and gear elements are housed in the microscope stand.

Thus, embodiment variations are included, wherein one of the control devices, e.g., is permanently connected on a predetermined place on the microscope, one of the control devices is positioned varying randomly next to the microscope, several control devices are permanently connected to the microscope in various places, or several of the control devices are positioned varying randomly next to the microscope.

The signal transfer between the control circuit and the drive motor can take place either through wire-connected or wireless means.

If a wire-connected signal transfer is chosen, it can take place, advantageously, via plug-in connectors, so that the connection can easily be established or disconnected. This applies for all previously described embodiment variations with regard to the positioning of one or several control devices relative to the microscope body.

In the following, the invention shall be further explained by means of embodiment examples. The corresponding drawings show:

DETAILED DESCRIPTION

Figure 1:
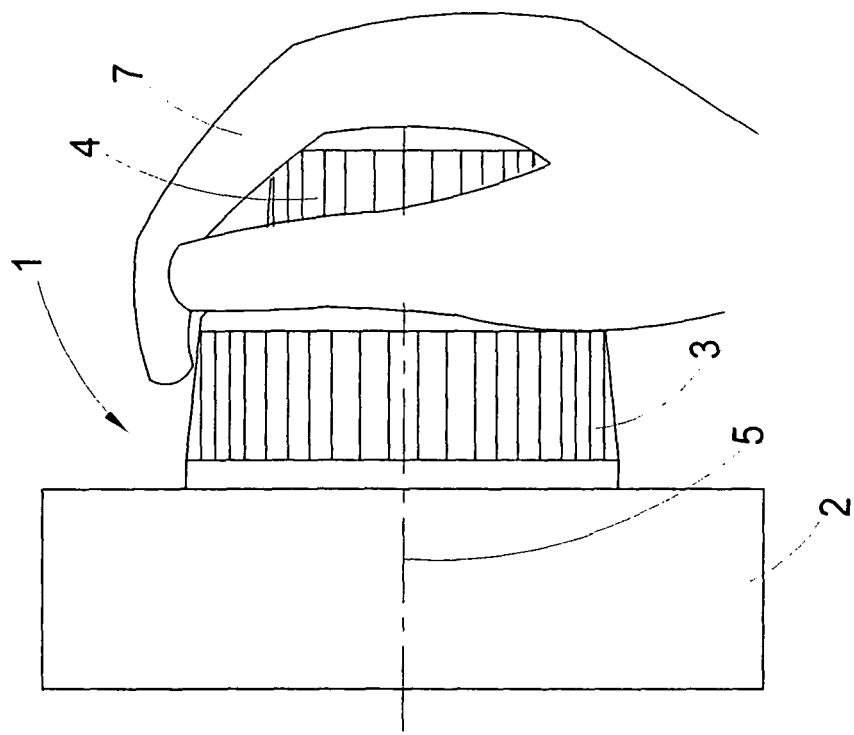
FIG. 1 a control device, arranged on the microscope stand, with two coaxial control knobs, which are not turnable against each other, equipped with a proximity switch which is connected to the control circuit.
Figure 1:
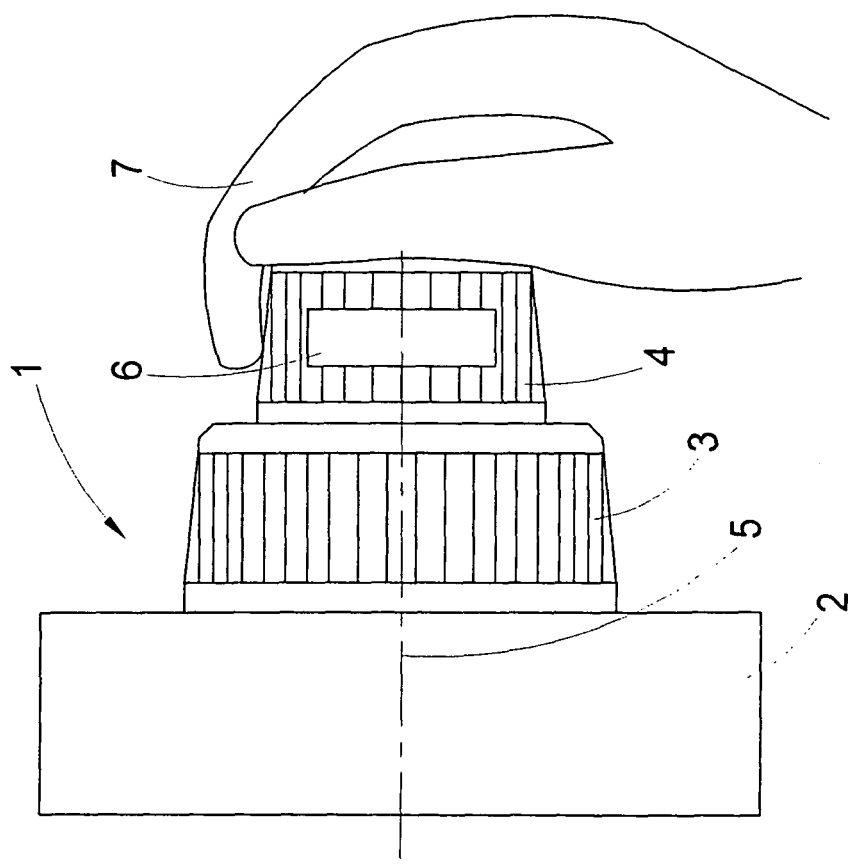

FIG. 1 shows a control device 1, arranged on the microscope stand 2, and equipped with two coaxial control knobs 3 and 4, whereby the control knobs 3, 4 are not turnable against each other. Therefore, they can only be turned jointly around the axis 5 without angular displacement with respect to each other.

Both control knobs 3, 4 are arranged on a mutual shaft (not shown in drawing) and connected to a rotary angle encoder via said shaft. Furthermore, FIG. 1 a shows a symbolically drawn proximity switch 6, which, same as the rotary angle encoder, is connected to a control circuit.

The rotary angle encoder is not shown in the drawing. Rotary angle encoders are known from prior art and, therefore, do not require further explanation, including their mechanical coupling to a control knob.

This also applies to the connection of rotary angle encoders with a control circuit, the connection of the control circuit with a drive motor, the connection of the drive motor via mechanical gear elements with the focusing element of the microscope, the position of which has to be adjusted in order to alter the focal position relative to a sample to be observed with the objective of mapping a sample or sample segment sharply for the eye of the observer or sharply for a receiving device. Depending on type and design of the microscope, such a focusing element can be, e.g., a microscope lens, a lens turret, the sample stage, a tube lens, or an intermediate tube.

The proximity switch 6 does not respond to the distance, as shown in FIG. 1a, of the operator's hand 7 to the control knob 4, to which the proximity switch is assigned as an example. The control circuit is displayed in such a way that in the event of a non-responding proximity switch 6, dependent on the rotation angle predetermined by both control knobs 3, 4, a fine adjustment of the focal position is triggered relative to the sample to be observed.

However, with the hand position shown in FIG. 1b, the control circuit, dependent on the rotation angle predetermined by both control knobs 3, 4, triggers a coarse adjustment of the focal position relative to the sample to be observed.

Figure 2:
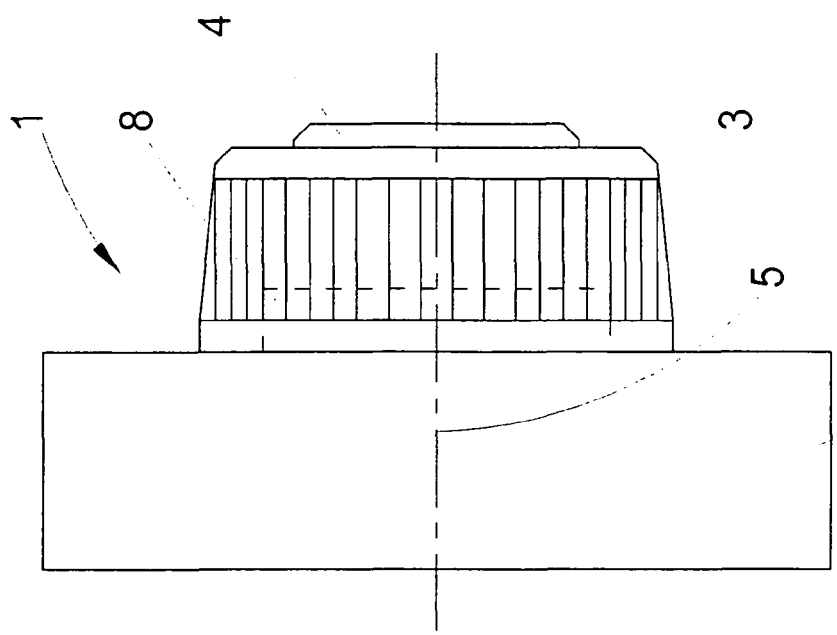
FIG. 2 a control device, arranged on the microscope stand, with two coaxial control knobs which are not turnable against each other, equipped with a limit switch, connected to the control circuit, and assigned to one of the control knobs.
Figure 2:
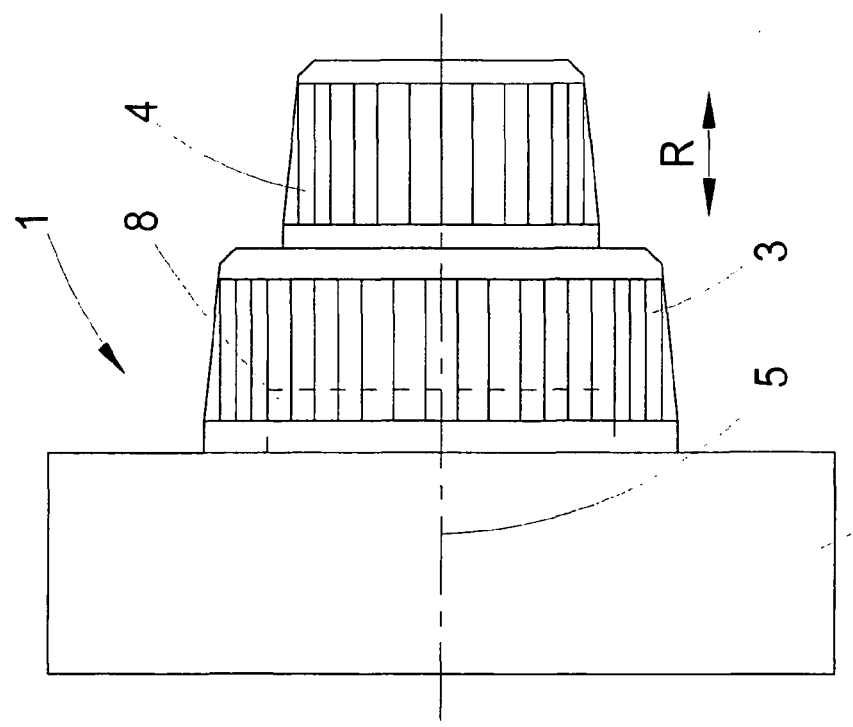

FIG. 2 shows a control device 1, arranged on the microscope stand 2, and equipped with two coaxial control knobs 3 and 4. Once again, as in the proposed solution in accordance with FIG. 1, the control knobs 3, 4 cannot be turned against each other but only jointly without angular displacement to each other around the axis 5 and are, therefore, attached to a mutual shaft. Via said shaft, the control knobs 3, 4 are connected to a rotary angle encoder.

Contrary to the proposed solution in accordance with FIG. 1, the control knob 4 is also axially movable in the direction R toward two end positions, one of which is shown in FIG. 2a and the other in FIG. 2b.

A limit switch 8, which, same as the rotary angle encoder, is connected to a control circuit, is integrated in the control device 1.

The limit switch 8 is not activated when the control knob 3 is in the position shown in FIG. 2a, and the control circuit is designed in such a way that a fine adjustment of the focal position relative to the sample to be observed is triggered through the non-activated limit switch 8, dependent on the rotation angle predetermined by both control knobs 3, 4.

However, if the control knob 4 is moved by the operator's hand 7 in the direction R and reaches the end position shown in FIG. 2b, the limit switch 8 is activated and sends a switchover signal to the control circuit. The control circuit is designed in such a way that a coarse adjustment of the focal position relative to the sample to be observed is triggered when said switchover signal, dependent on the rotation angle predetermined by both control knobs 3, 4, occurs.

Figure 3:
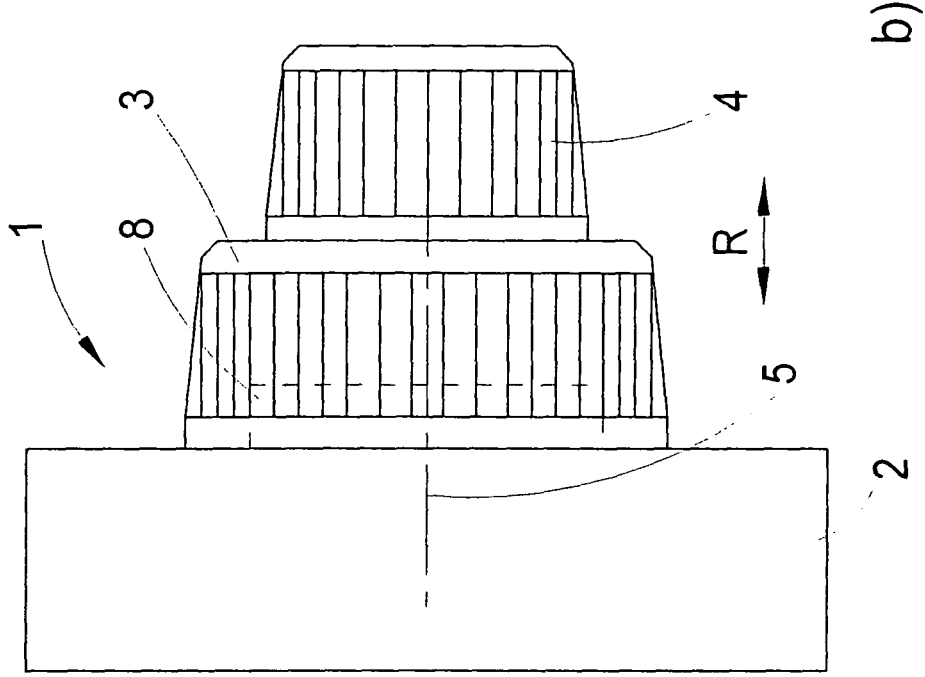
FIG. 3 a control device, arranged on the microscope stand, with two coaxial control knobs which are not turnable against each other, equipped with a limit switch, connected to the control circuit, and assigned to both control knobs.
Figure 3:
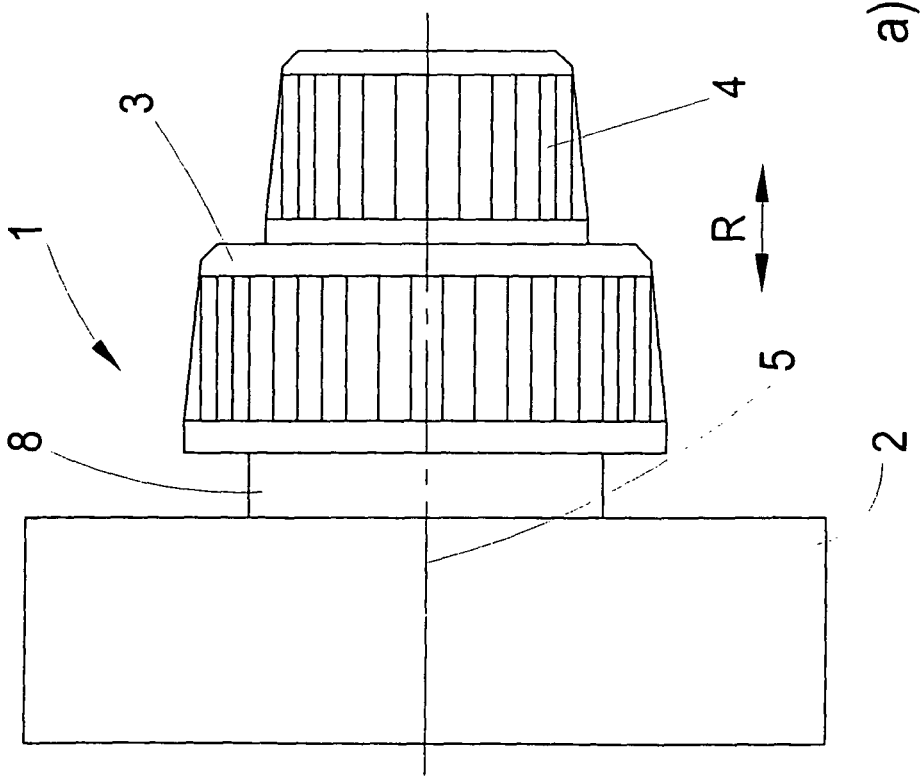

The proposed solution depicted in FIG. 2 can also be designed as shown in the example in FIG. 3. Thereby, both control knobs 3, 4 are axially movable in direction R, whereby the manual moving of both control knobs 3, 4 from the end position shown in FIG. 3a to the end position shown in FIG. 3b activates the limit switch 8 and triggers a switchover between fine and coarse focusing with said axial movement.

Advantageously, a return spring can be integrated in the control device of the embodiments in accordance with FIG. 2 and FIG. 3, which effects a reset of one control knob (FIG. 2) and/or both control knobs (FIG. 3) in the initial end position.

The invention claimed is:

1. A microscope with a control device, the control device for the focusing operation of a microscope, the control device comprising:
    a pair of control knobs for absorption of movement of fingers or a hand of an operator, the pair of control knobs coaxially arranged on a shaft and connected through the shaft to a rotary angle encoder such that the pair of control knobs is turnable jointly and without angular displacement relative to one another on a rotation axis;
    a control circuit for a drive motor, the control circuit connected to the rotary angle encoder and the drive motor providing an adjusting movement for changing a focal position of the microscope relative to a sample to be observed; and
    a toggle switch connected to the control circuit and activated through touching or moving of one or both of the pair of control knobs;
    wherein the control circuit is configured to be dependent on a rotation angle predefined by the pair of control knobs and on activation of the toggle switch to generate either a coarse or a fine adjustment of the focal position of the microscope relative to the sample to be observed.

2. The microscope with a control device according to claim 1,
    wherein the toggle switch is a proximity switch and is assigned to one of the pair of control knobs;
    wherein when a hand or the fingers of a hand of an operator are proximate to and trigger the proximity switch assigned to one of the pair of control knobs, a coarse adjustment of the focal position is generated by the control circuit, dependent on a rotation angle predefined by both of the pair of control knobs; and
    wherein when a hand or the fingers of a hand of an operator do not trigger the proximity switch assigned to one of the pair of control knobs, a fine adjustment of the focal position is generated by the control circuit, dependent on rotation of both control knobs.

3. The microscope with a control device according to claim 2, wherein the pair of control knobs comprises a larger diameter knob and a smaller diameter knob and the proximity switch is on the smaller diameter knob, and wherein the control circuit is configured such that rotation of both of the pair of control knobs generates a coarse adjustment of the focal position when the smaller diameter knob is covered with the hand or the fingers of the hand of the operator.

4. The microscope with a control device according to claim 1, wherein
    at least one of the pair of control knobs is axially movable between two end positions; and
    the toggle switch is designed as a limit switch and assigned to one of the end positions, such that the control circuit, dependent on a rotation angle predefined by the pair of control knobs, generates a coarse adjustment of the focal position when there is an axial shift of one or both of the pair of control knobs, and an activation of the limit switch, triggered by the axial shift; and
    wherein the control circuit, dependent on a rotation angle predefined by the pair of control knobs, generates a fine adjustment of the focal position when the limit switch is not activated.

5. The microscope with a control device according to claim 4, whereby both of the pair of control knobs are axially movable.

6. The microscope with a control device according to claim 5, whereby one of the pair of control knobs is axially movable.

7. The microscope with a control device according to claim 1, whereby both of the pair of control knobs are designed with different diameters, whereby the control knob with the smaller diameter is assigned to fine adjustment while the control knob with the greater diameter is assigned to coarse adjustment.

8. The microscope with a control device according to claim 2, whereby both of the pair of control knobs are designed with different diameters, whereby the control knob with the smaller diameter is assigned to fine adjustment while the control knob with the greater diameter is assigned to coarse adjustment.

9. The microscope with a control device according to claim 4, whereby both of the pair of control knobs are designed with different diameters, whereby the control knob with the smaller diameter is assigned to fine adjustment while the control knob with the greater diameter is assigned to coarse adjustment.

10. The microscope with a control device according to claim 1, wherein the microscope has a stand, and wherein the control device is a separate assembly detached from the microscope stand and is therefore freely positionable with respect to the microscope, whereby the assembly includes both control knobs and at least the one rotary angle encoder.

11. The microscope with a control device according to claim 10, wherein wire-connected or wireless signal transfers between the control circuit and the drive motor are provided.

12. The microscope with a control device according to claim 11, wherein wire-connected signal transfers are provided via plug-in connectors and the transfers can be established or disconnected, if required.

13. A method of controlling the focusing operation of a microscope with a control device, the method comprising:
    receiving on a pair of control knobs the fingers or the hand of an operator, the pair of control knobs coaxially arranged on a shaft and connected through the shaft to a rotary angle encoder such that the pair of control knobs is turnable jointly and without angular displacement relative to one another on a rotation axis, and wherein a control circuit for a drive motor is connected to the rotary angle encoder, the drive motor providing an adjusting movement for changing a focal position of the microscope relative to a sample to be observed;
    activating a toggle switch connected to the control circuit through touching or moving of one or both of the pair of control knobs, wherein rotation of both of the pair of control knobs is toggled to either coarse or fine; and
    adjusting the focal position of the microscope relative to the sample to be observed with either a coarse or a fine adjustment by rotation of the pair of control knobs by the fingers or hand of the operator.

14. A control device for the focusing operation of a microscope, the control device comprising:
    a pair of control knobs for absorption of movement of fingers or a hand of an operator, the pair of control knobs coaxially arranged on a shaft and connected through the shaft to a rotary angle encoder such that the pair of control knobs is rotationally fixed with respect to one another with regard to a rotation axis;

a control circuit for a drive motor, the control circuit connected to the rotary angle encoder and the drive motor providing an adjusting movement for changing a focal position of the microscope relative to a sample to be observed; and a toggle switch connected to the control circuit and activated through touching or moving of one or both of the pair of control knobs;

wherein the control circuit is configured to be dependent on a rotation angle predefined by the pair of control knobs and on activation of the toggle switch to generate either a coarse or a fine adjustment of the focal position of the microscope relative to the sample to be observed.

15. A method of focusing a microscope with a pair of control knobs coaxially positioned and rotationally fixed with respect to one another, the method comprising:

engaging one or both of the pair of control knobs in a particular manner to toggle between a coarse adjustment provided by both knobs and a fine adjustment provided by both knobs.

16. The method of claim 15 wherein the toggling is provided by a proximity switch.

17. The method of claim 15, wherein the toggling is provided by axially moving at least one of the pair of control knobs.

* * * * *

UNITED STATES PATENT AND TRADEMARK OFFICE
CERTIFICATE OF CORRECTION

PATENT NO.         : 8,482,852 B2  
APPLICATION NO.    : 12/680181  
DATED              : July 9, 2013  
INVENTOR(S)        : Harald Schadwinkel et al.

Page 1 of 1

It is certified that error appears in the above-identified patent and that said Letters Patent is hereby corrected as shown below:

On the Title page item (73) please add --Carl Zeiss Microscopy GmbH-- as the Assignee.

Signed and Sealed this  
Eleventh Day of August, 2015

Michelle K. Lee  
*Director of the United States Patent and Trademark Office*

UNITED STATES PATENT AND TRADEMARK OFFICE
CERTIFICATE OF CORRECTION

PATENT NO. : 8,482,852 B2
APPLICATION NO. : 12/680181
DATED : July 9, 2013
INVENTOR(S) : Harald Schadwinkel et al.

Page 1 of 1

It is certified that error appears in the above-identified patent and that said Letters Patent is hereby corrected as shown below:

On the Title page item (76) should read ----Item (75)

On the Title page item (73) please add --Carl Zeiss Microscopy GmbH-- as the Assignee.

This certificate supersedes the Certificate of Correction issued August 11, 2015.

Signed and Sealed this
Tenth Day of November, 2015

Michelle K. Lee
*Director of the United States Patent and Trademark Office*